United States Patent
Szalwinski et al.

(10) Patent No.: US 6,266,679 B1
(45) Date of Patent: Jul. 24, 2001

(54) METHOD AND APPARATUS FOR HIERARCHICAL STORAGE OF DATA FOR EFFICIENT ARCHIVING AND RETRIEVAL OF DATA

(75) Inventors: Bruce Szalwinski; Michael E. Winslett, both of Austin, TX (US)

(73) Assignee: AMD. Inc., Austin, TX (US)

( * ) Notice: Subject to any disclaimer, the term of this patent is extended or adjusted under 35 U.S.C. 154(b) by 0 days.

(21) Appl. No.: 09/416,071

(22) Filed: Oct. 12, 1999

(51) Int. Cl.[7] ........................................... G06F 17/30
(52) U.S. Cl. ....................... 707/204; 707/203; 707/200
(58) Field of Search ............................. 707/103, 200, 707/204, 1, 203

(56) References Cited

U.S. PATENT DOCUMENTS

| | | | |
|---|---|---|---|
| 5,034,914 | * | 7/1991 | Osterlund .............................. 364/900 |
| 5,276,865 | * | 1/1994 | Thorpe ................................. 707/204 |
| 5,423,034 | * | 6/1995 | Cohen-Levy et al. ................. 707/10 |
| 5,625,816 | * | 4/1997 | Burdick et al. ...................... 707/103 |
| 5,732,131 | * | 3/1998 | Nimmagadda et al. ............. 379/211 |
| 5,758,155 | * | 5/1998 | Circenis ............................... 707/10 |
| 5,764,972 | * | 6/1998 | Crouse et al. ........................ 707/1 |
| 5,778,395 | * | 7/1998 | Whiting et al. ..................... 707/204 |
| 5,829,047 | * | 10/1998 | Jacks et al. .......................... 707/204 |
| 5,848,408 | * | 12/1998 | Jakobsson et al. .................... 707/3 |

* cited by examiner

*Primary Examiner*—Thomas Black
*Assistant Examiner*—Frantz Coby
(74) *Attorney, Agent, or Firm*—Williams, Morgan & Amerson, P.C.

(57) ABSTRACT

The present invention provides for a method and an apparatus for archiving and retrieving data. At least one top-level directory is created to store files. A file-location database is created to track stored files in the top level directory. Files from a primary database are received. Files received from the database are archived into the top level directory, in response to receiving files from a primary database. An immediate backup of the archived files is created. A long-term backup of the archived files is created.

40 Claims, 9 Drawing Sheets

METHOD AND APPARATUS FOR HIERARCHICAL STORAGE OF DATA FOR EFFICIENT ARCHIVING AND RETRIEVAL OF DATA

BACKGROUND OF THE INVENTION

1. Field of the Invention

This invention relates generally to data management, and, more particularly, to a method and means for hierarchical storage of data to achieve efficient archiving and retrieval of data.

2. Description of the Related Art

The technology explosion in the manufacturing industry has resulted in many new and innovative manufacturing processes. Today's manufacturing processes, particularly semiconductor manufacturing processes, call for a large number of important steps. These process steps are usually vital; therefore, a large number of data files are generated to properly document the process steps.

The manufacture of semiconductor devices requires a number of discrete process steps to create a packaged semiconductor device from raw semiconductor material. The various processes, from the initial melt and refinement of the semiconductor material, the slicing of the semiconductor crystal into individual wafers, the fabrication stages (etching, doping, ion implanting, or the like), to the packaging and final testing of the completed device, are so different from one another and specialized that the processes may be performed in different facilities in remote regions of the globe.

For example, the process of growing and refining a large semiconductor crystal (e.g., Si, GaAs, or the like) may be performed by a foundry specializing in such crystal growth techniques. The resultant crystals may then be sold directly to a semiconductor manufacturer, either as large crystals, or as wafers sliced from a large crystal.

The semiconductor manufacturer may then slice the semiconductor crystal into wafers, if the semiconductor material is not already in wafer format. The semiconductor manufacturer then fabricates semiconductor circuit devices (e.g., microprocessor, DRAM, ASIC, or the like) on individual wafers, usually forming a number of devices on each wafer. The individual fabrication (or "FAB") processes include photolithography, ion implantation, and other associated FAB processes known in the art. Typically, the resultant semiconductor device is tested on the wafer during and after the FAB process.

Once the semiconductor devices have been fabricated and tested on the wafer, the wafer is sliced up into individual semiconductor chips and packaged. The packaging process includes mounting and wire-bonding the individual chips to chip carriers (e.g., PLCCs, DIPs, CER-DIPs, surface mount carriers, or the like) and final testing of the resultant packaged semiconductor device. This packaging process is fairly labor intensive, and thus it may be desirable to perform the mounting, wire-bonding, and final testing at an offshore facility where labor rates may be cheaper. Once completed, the packaged semiconductor device may again be tested, and then labeled and shipped to customers through a distribution system.

One problem that arises in current manufacturing-data management techniques, is that the various processes take place at different discrete locations. Thus, it is difficult to track a semiconductor device through the fabrication process from single crystal to finished product. Such tracking may be useful for quality control purposes to determine the causes of product problems that may result in low yields or circuit defects. Tracking data files that correspond to all of the steps in the fabrication process, and managing those data files, is a very difficult task.

Another problem with current methods of storing data files is that a large amount of resources is required to store, archive, and retrieve data. A more organized manner of performing storage management of data would greatly improve manufacturing processes. Large sections of data could be stored, archived, and retrieved in an efficient manner with such a storage management vehicle. Better data management would improve manufacturing capabilities.

The present invention is directed to overcoming, or at least reducing the effects of, one or more of the problems set forth above.

SUMMARY OF THE INVENTION

In one aspect of the present invention, a method is provided for archiving and retrieving data. At least one top-level directory is created to store files. A file-location database is created to track stored files in the top level directory. Files from a primary database are received. Files received from the database are archived into the top level directory, in response to receiving files from a primary database. An immediate backup of the archived files is created. A long-term backup of the archived files is created.

In another aspect of the present invention, a system is provided for archiving data. The system provided by the present invention comprises; a network for transmitting and receiving data; at least one input system, coupled to the network, for inputting data in at least a first format; a reformatter, coupled to the network, for receiving the data and reformatting the data into a predetermined format to produce reformatted data; a primary database, coupled to the network, for storing the reformatted data; a loader, coupled to the primary database, for loading the reformatted data into the primary database; at least one client workstation, coupled to the network, for receiving data search requests; a front end server, coupled to the network, for receiving the primary database search requests and processing the search requests, querying the primary database, receiving reformatted data from the primary database, and outputting the reformatted data; at least one data archiver, coupled to the primary database for archiving at least a portion of the data stored in the primary database according to a predetermined archiving algorithm, and for transferring archived data to an archive storage media; means for creating at least one top-level directory to archive the data stored in the primary database; means for creating at least one subdirectory within the top level directory; means for creating a file-location database to track stored files in the subdirectory and the top level directory; means for receiving the data stored in the primary database, to archive the data the top level directory; means for executing an archiving process to archive the data stored in the primary database, in response to receiving files from a primary database; means for creating an immediate backup of the archived data; and means for creating a long-term backup of the archived data.

BRIEF DESCRIPTION OF THE DRAWINGS

The invention may be best understood by reference to the following description taken in conjunction with the accompanying drawings, in which like reference numerals identify like elements, and in which.

Figure 1:
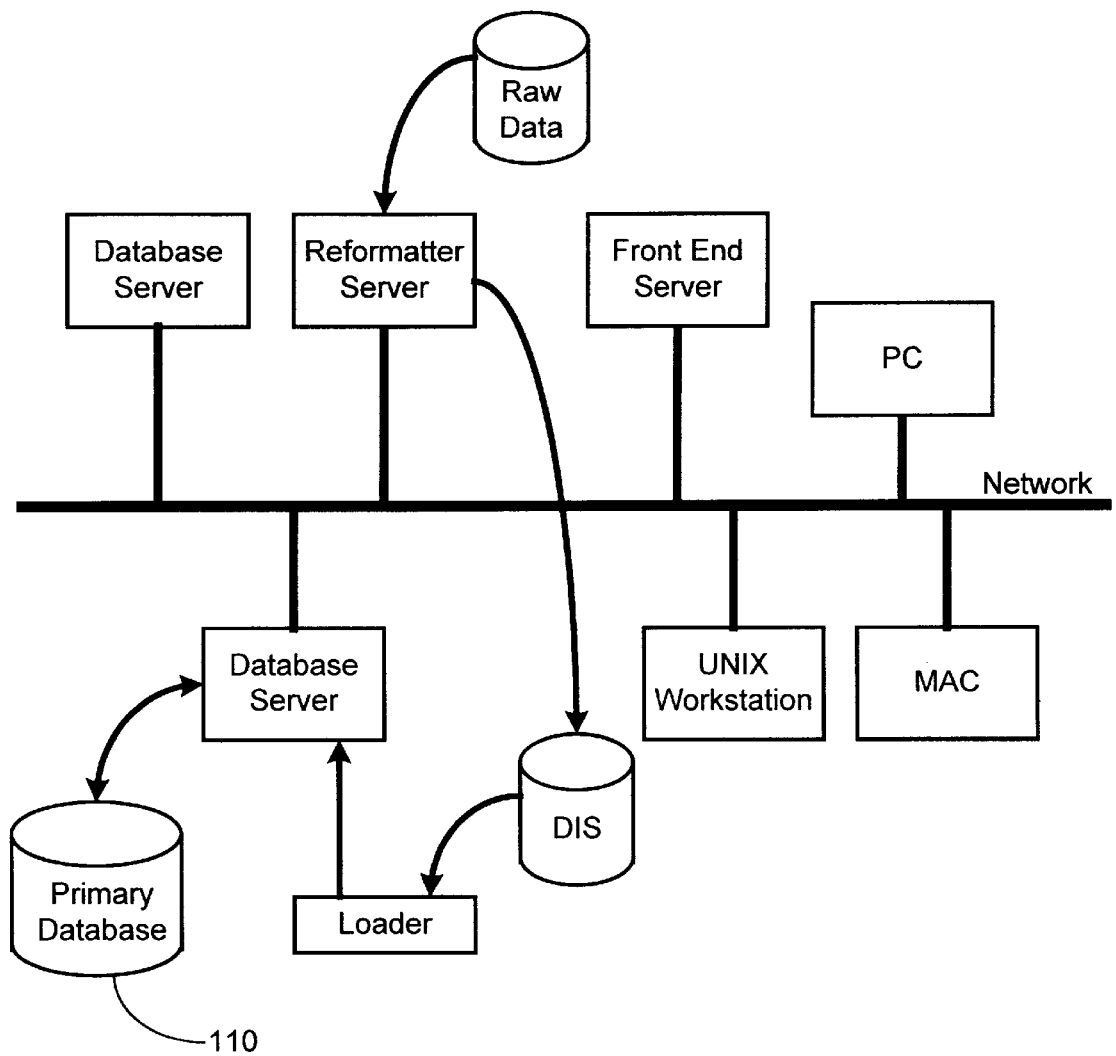
FIG. 1 illustrates a prior art means for acquiring and storing data relating to manufacturing processes.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Storing, archiving, and retrieving data is very important in the area of high-technology manufacturing, particularly in the area of semiconductor manufacturing. Scores of data files from many steps in the processes of semiconductor manufacturing are stored and archived for later retrieval. The present invention provides for an apparatus and a method for archiving and retrieving data in a hierarchical fashion. The data that is archived can be received from any data source, such as a large database. One such source is a data collecting, storing, and retrieving system that generates a primary database, and is described in U.S. Pat. No. 5,625,816, which is hereby incorporated by reference in its entirety. FIG. 1 generally illustrates the prior art data collecting, storing, and retrieving system that is described by U.S. Pat. No. 5,625,816. The method and apparatus described by the present invention interacts with a primary database 110 to store and retrieve files that are archived. The actual archiving of the data files from the primary database 110 can be performed using one of a number of archiving methods. One such archiving method is described in U.S. patent application Ser. No. 09/225,438 filed on Jan. 5, 1999 entitled "Method and apparatus for parallel processing for archival and retrieval of data", and U.S. patent application Ser. No. 09/225,394 filed on Jan. 5, 1999, entitled "Method and apparatus for archiving and deleting large data sets", which are both hereby incorporated by reference in their entirety, and are subject to a common assignee.

Figure 2:
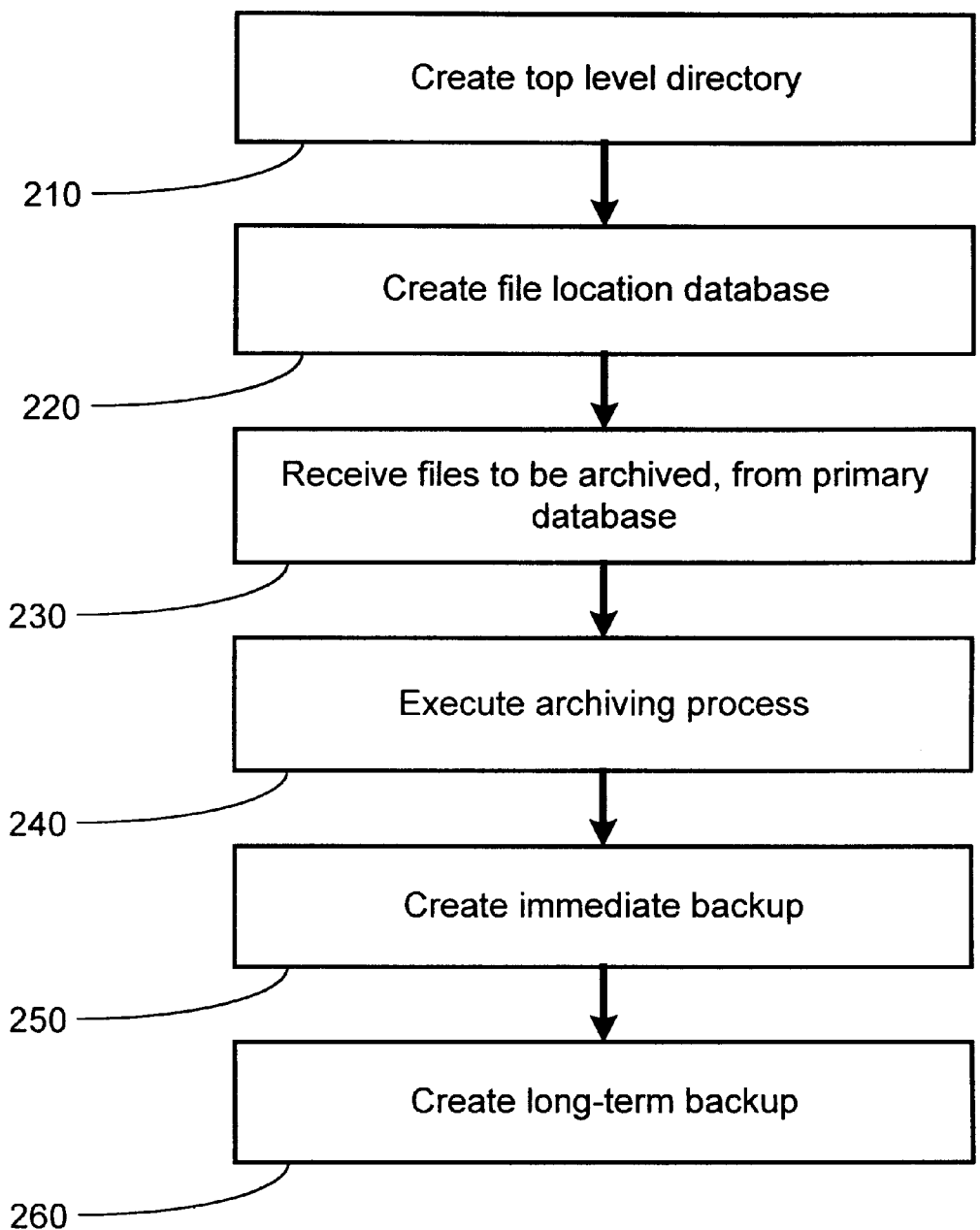
FIG. 2 is an illustration of one embodiment of the method of the present invention, relating to data archiving, depicted in a flowchart form.
Figure 3:
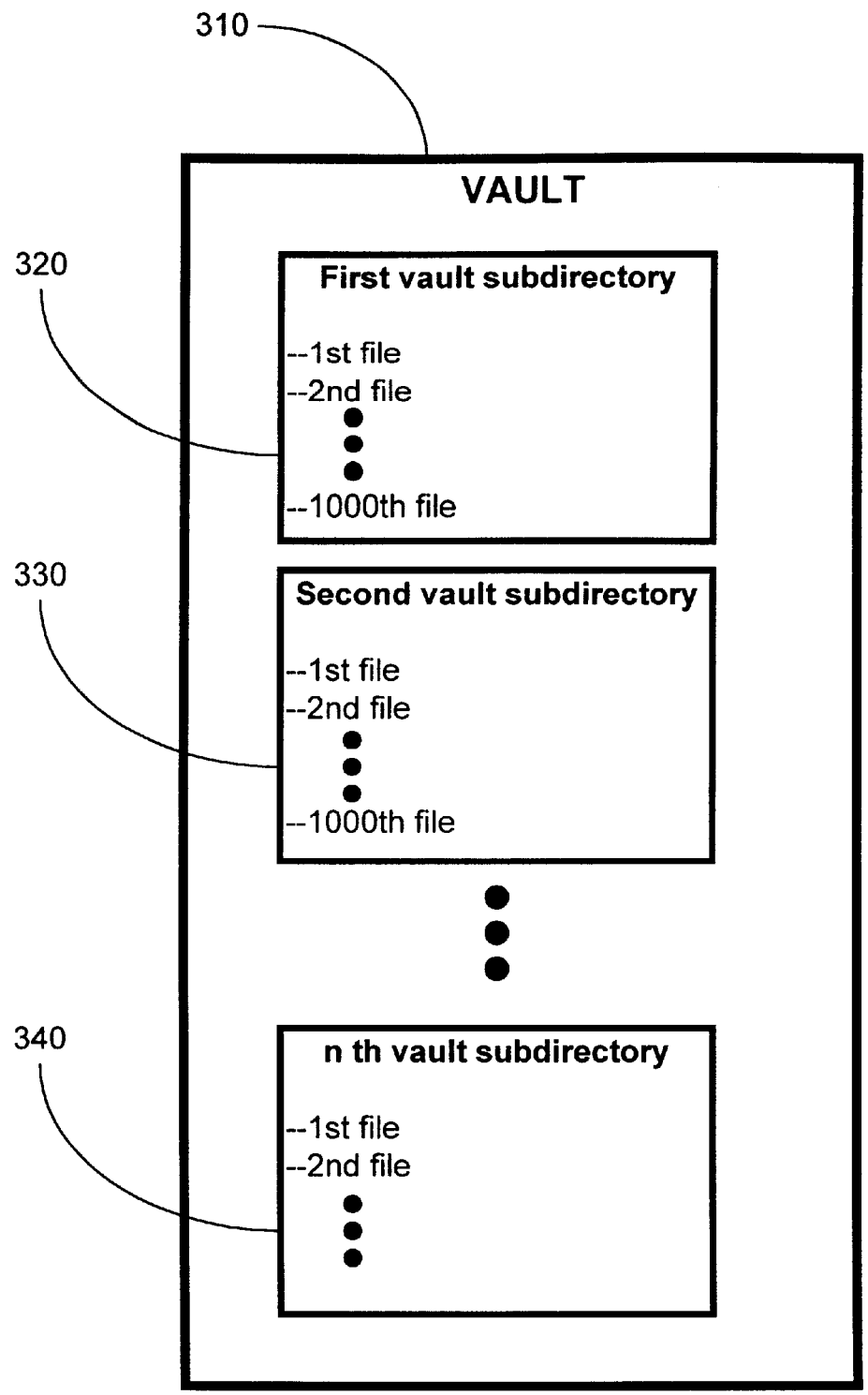
FIG. 3 depicts one embodiment of a block diagram that represents the structure of the top-level directory described in FIG. 2.

Turning now to FIG. 2, a top-level directory is created for archiving data, as described in block 210 is shown. Turning now to FIG. 3, a block-diagram representation of the structure of the top-level directory is illustrated. The top-level directory is called a vault 310, as shown in FIG. 3. The vault 310 comprises multiple subdirectories, a first vault subdirectory 320 through an nth vault subdirectory 340, which are sequenced and identified in a numerical fashion. The files that are archived are stored in the vault 310. A file location database (not shown) is created to hold the file locations of the files that are archived in the vault 310, as described in block 220 of FIG. 2. Files to be archived are received from the primary database 110, as described in block 230 of FIG. 2.

Once data is ready to be stored, the archiving process is executed, as described in block 240 of FIG. 2. The archiving process described in block 240 of FIG. 2 is shown in greater detail in FIG. 4. Files to be archived are received from the primary database 110, as shown in block 410 of FIG. 4. The file to be archived is assigned and stored into the highest numbered vault subdirectory (the nth vault subdirectory 340) in the vault 310, as described in block 420. In one embodiment, files to be archived are placed into the vault subdirectories 320, 330, 340 until the subdirectories contain one thousand archived files. The archiving process continuously places files into the highest numerical vault subdirectory (nth subdirectory 340) until that subdirectory contains one thousand files, as described by blocks 420 and 430 in FIG. 4.

Figure 4:
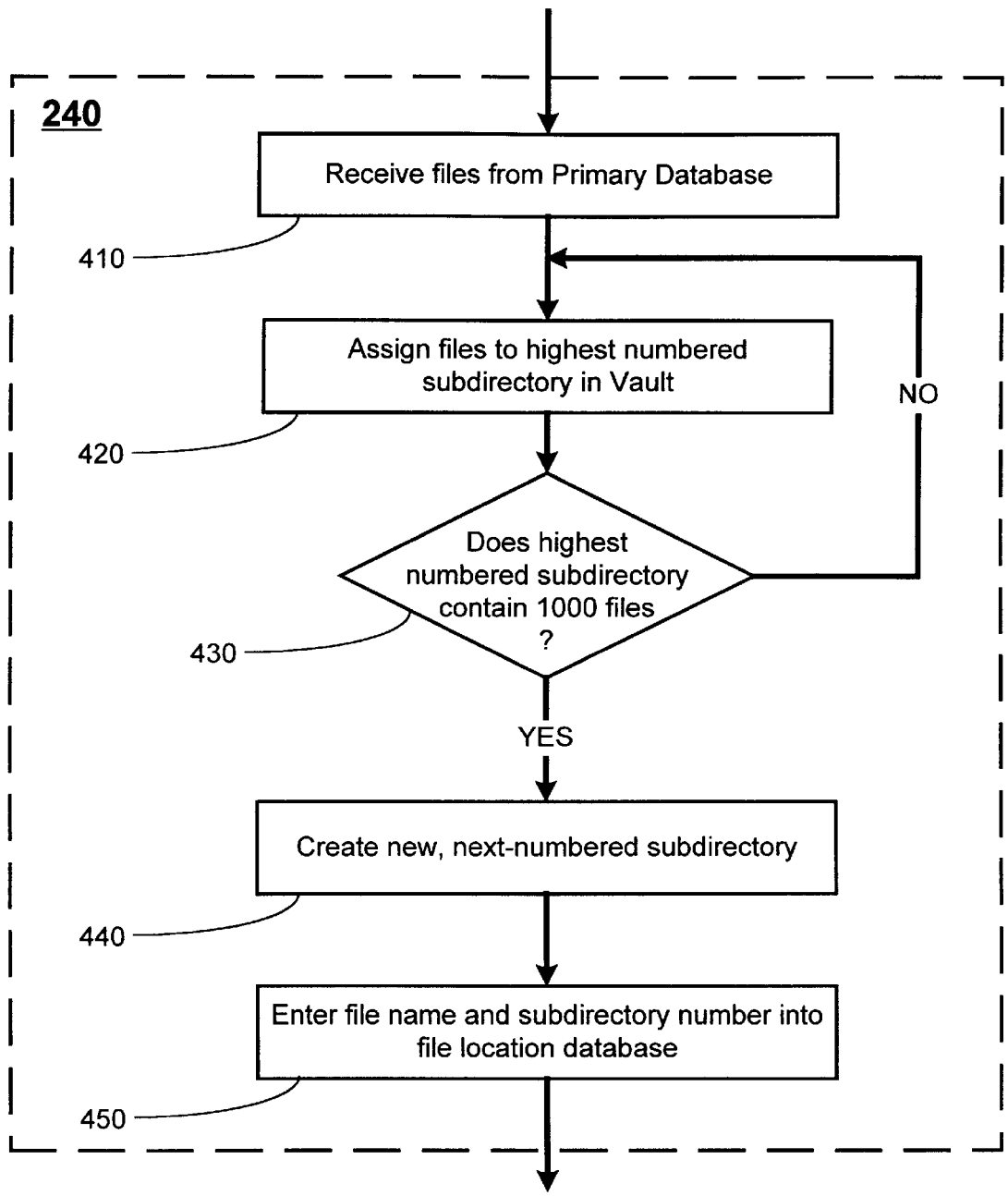
FIG. 4 depicts one embodiment of a more detailed illustration of the archiving process step described in FIG. 2.

Once the highest vault subdirectory 340 contains one thousand archived files, a new subdirectory is created in the vault 310, as described in block 440 of FIG. 4. The new subdirectory that is created in the vault 310 is given the next higher numerical identifier, thereby becoming the new, highest numerical vault subdirectory 340. The names of the files that are archived, and the vault subdirectory number, are recorded into the file location database, as described in block 450 of FIG. 4. At this point, the files that are to be archived are placed in the vault 310, and a database that holds the information needed to retrieve the archived files is generated.

Due to the nature of computers and data storage devices, certain faults may occur and data may get lost or become irretrievable. Some of these faults include power problems and data corruption problems. To substantially reduce the risk of losing data in the event of a computer failure, in one embodiment, at least two levels of file backup procedures are implemented. The first file backup procedure is an immediate file backup procedure. In one embodiment, the immediate file backup procedure is conducted immediately following the original file storing procedures. Referring to FIG. 2, the files that are archived are also stored into an immediate file backup location, as described in block 250. The immediate file backup process, as described in block 250 of FIG. 2, is described in greater detail in FIG. 5.

Figure 5:
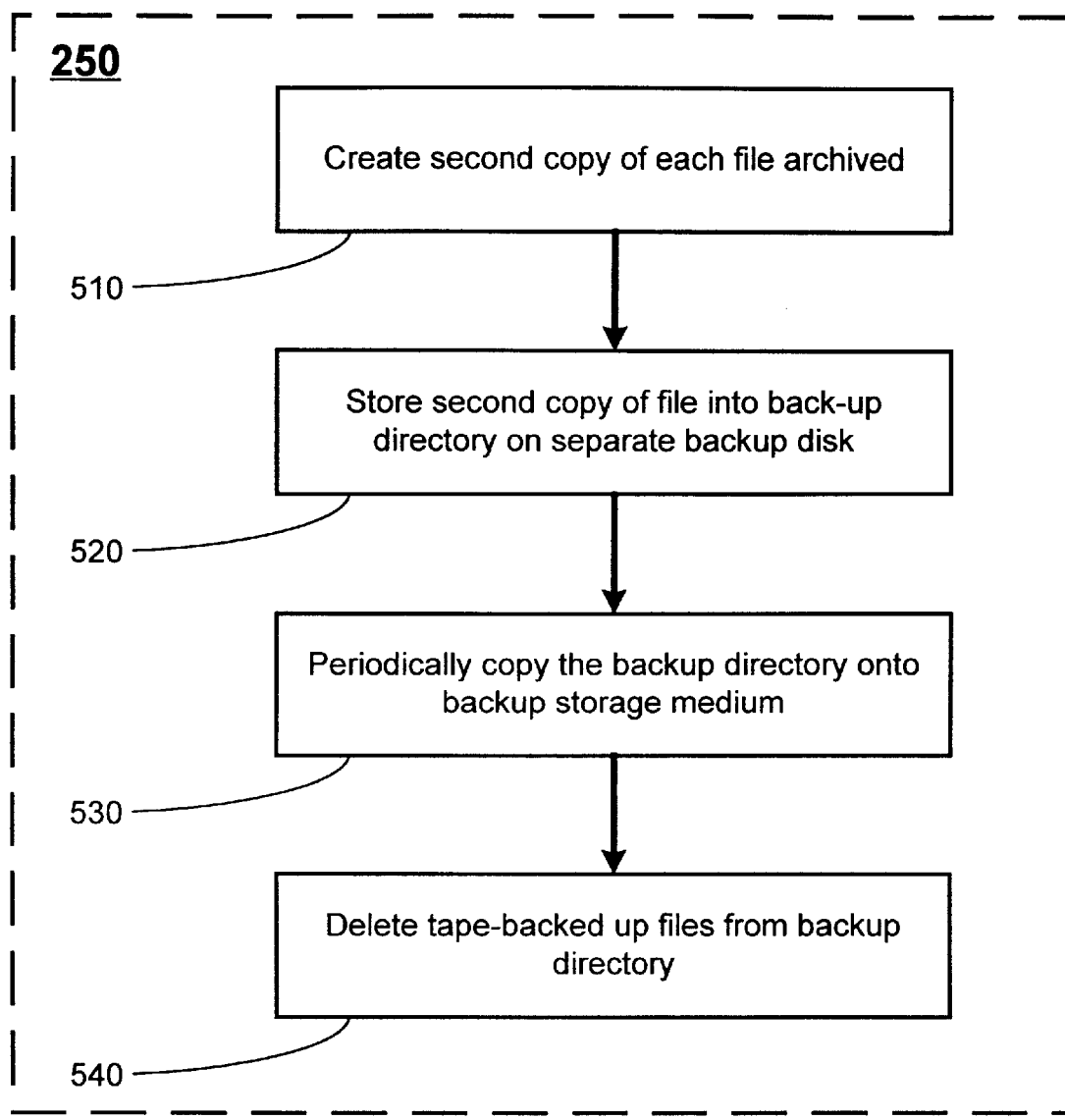
FIG. 5 depicts one embodiment of a more detailed illustration of the step of creating an immediate backup, as described in FIG. 2.

To create a backup file, a second copy of each file that is archived is created, as described in block 510 of FIG. 5.

Once the second copy of the archived file is created, the second copy of the file is then stored into a backup directory, as described in block 520 of FIG. 5. In one embodiment, the backup directory is generally located on a separate backup disk. In one embodiment, the files that are backed up are stored in a single, large backup directory, instead of employing multiple subdirectories as used in the primary archiving procedures. The files that are archived are accumulated into the backup directory.

Periodically, the backup directories, along with all of the files stored in them, are further backed up onto a backup storage medium, as described in block 530 of FIG. 5. In one embodiment, the backup storage medium is a backup tape. In one embodiment, the backup directories are designed to hold an amount of data that corresponds to approximately a one week period of data acquisition time, which may vary with different manufacturing processes. Therefore, the backup directories, along with all of the files stored in them, are generally copied to backup tapes on a weekly basis. Once the files in the backup directories are stored on a backup storage medium, they are deleted from the backup directories on the backup disk, as described in block 540 of FIG. 5. In one embodiment, the backup storage medium is a backup tape. Thus, the backup directory on the backup disk will be capable of receiving more backup data, for at least another week.

At this point, the immediate backup procedure, as described in block 250 of FIG. 2 is generally complete. Up through block 250 of FIG. 2, the files to be stored have been archived and have been sent through an immediate backup procedure. Despite the implementation of the immediate backup procedure of block 250, resource constraint issues, such as disk space for the vaults 310, must be resolved. Therefore, the present invention teaches a method for creating a long-term backup of archived data, as described in block 260 of FIG. 2.

Figure 6:
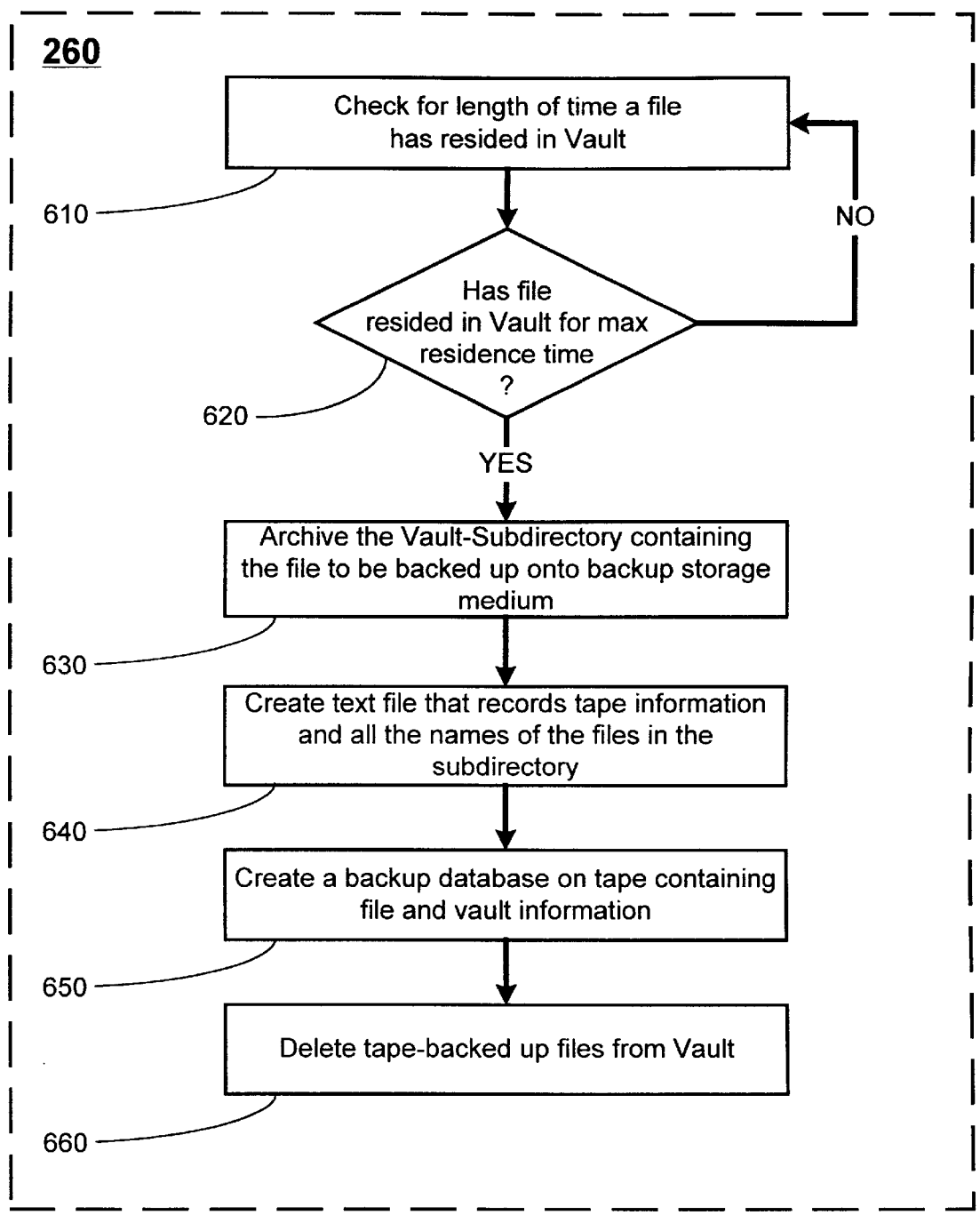
FIG. 6 depicts one embodiment of a more detailed illustration of the step of creating a long-term backup, as described in FIG. 2.

The long-term file backup process, as described in block 260 of FIG. 2, is described in further detail in FIG. 6. The long-term backup procedure is based upon storing data in an organized manner in response to a predetermined age of archived data. The length of time that files remain is detected and a particular vault subdirectory 340 is tapped off for backup storage. To implement the long-term backup procedure, the length of time that a file in a vault subdirectory 340 has resided is detected, as described in block 610 of FIG. 6. In one embodiment, the age of the latest file written in a vault subdirectory 340 is detected by checking the modification date of the vault subdirectory 340 itself. The modification date of the vault subdirectory 340 generally indicates the time that the last file was written into that subdirectory.

Once the time that the last file was written into a vault subdirectory 340 is determined, a decision is made regarding whether the latest file written into the vault subdirectory 340 has resided there for a predetermined maximum residence time, as described in block 620 of FIG. 6. In one embodiment the predetermined maximum residence time is generally limited to approximately six months. The maximum residence time can be varied by those with ordinary skill in the art, based upon many factors, including manufacturing production rates. If the latest file in a vault subdirectory 340 has not resided therein for the maximum residence time, then the long-term backup procedures are not invoked, and the age of stored files are continuously monitored.

When the latest file that is written into a vault subdirectory 340 has resided therein for at least the maximum residence time, the vault subdirectory 340 containing that file is backed up onto a backup storage medium, as described in block 630. In one embodiment, the backup storage medium is a backup tape. Since an entire vault subdirectory 340 is backed up during the long-term backup procedure, proper documentation of all of the files residing within the vault subdirectory 340 is important. Therefore, a text file is created to record the identification information regarding the backup storage medium (such as a backup tape), along with the identification information of all of the files that are located in the vault subdirectory 340, as described in block 640. When the text file is queried in search of a particular file, the text file can provide the file name, the file number, and the identification information regarding the backup storage medium, including the design number of the backup storage medium.

In one embodiment, in addition to the text file that contains the long-term backup, information, another database is created that contains the backed up file data and information regarding the vault that housed the vault subdirectory 340 containing the backed up file, as described in block 650. This database provides additional backup for the text file containing the backup file information. The backup information database can be stored on a disk or on the backup storage medium itself. Once the archived files are properly backed up, the files that have been sent through the long-term backup procedures are deleted from the vault 310, as described in block 660 of FIG. 6. Once the backed up files are deleted from the vault 310, there is additional space available for archiving new incoming files, concluding the long-term backup procedure described in block 260 of FIG. 2.

Figure 7:
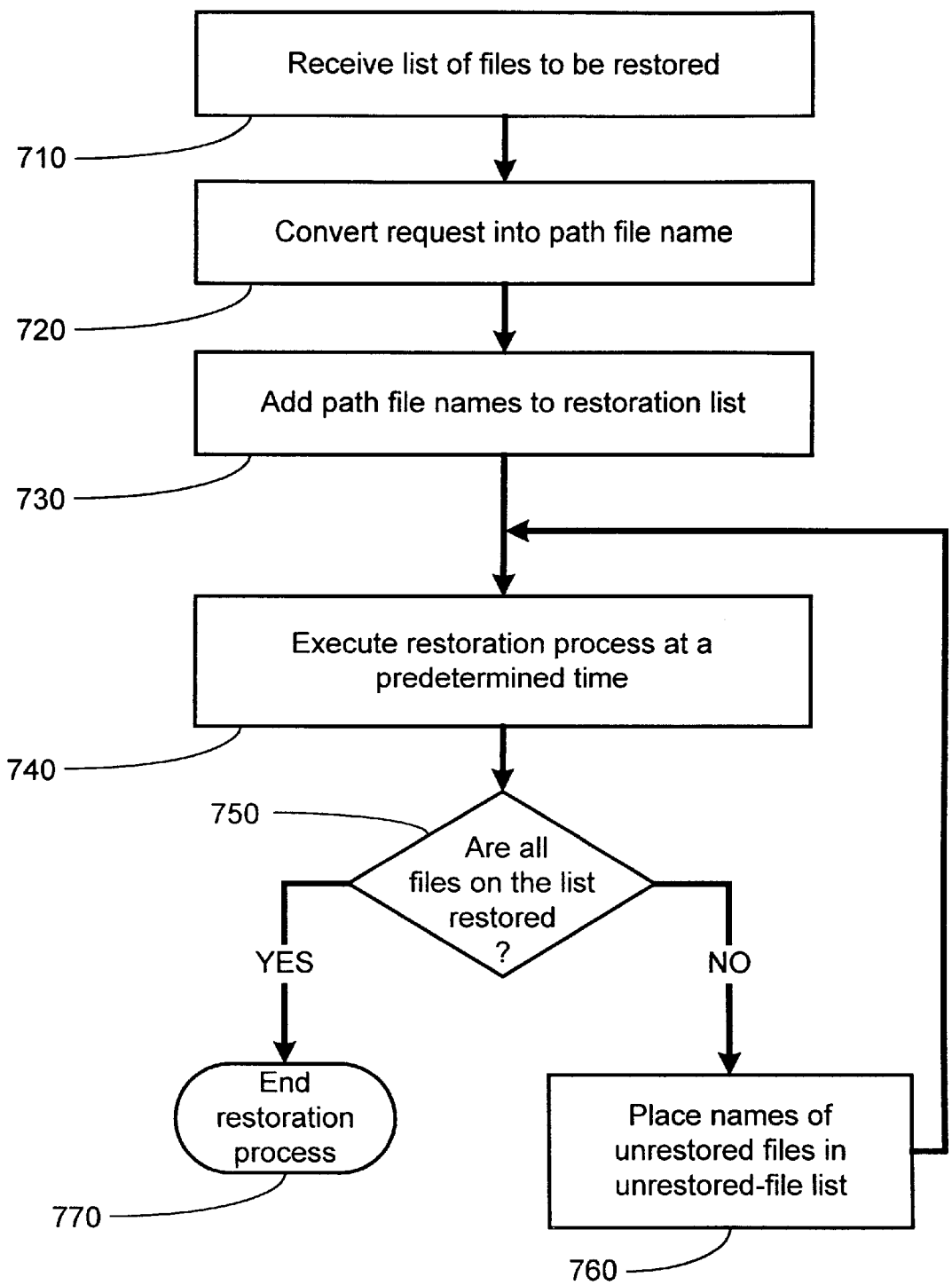
FIG. 7 depicts one embodiment of the method of the present invention, relating to the retrieval of archived data.

Turning now to FIG. 7, the present invention teaches a method for retrieving archived data and backup data. A list of the files that are to be restored is received, as described in block 710 of FIG. 7. In one embodiment, the list of files to be retrieved may be a list of file names in a text file. The list of the files that are to be retrieved is then converted into path file names that were archived and are to be brought back and reloaded into the primary database 110, as described in block 720. The path file name indicates the location where the archived file that is to be retrieved is stored. The path file names are then added to a restoration list, as described in block 730 of FIG. 7. The restoration list contains the path file names of the files that are to be restored into the primary database 110. Once path file names are added into the restoration list, the restoration process is executed at a predetermined time, as described in block 740 of FIG. 7. In one embodiment, the predetermined time when the restoration process is executed is generally a low-activity period of time, such as the nighttime.

Figure 8:
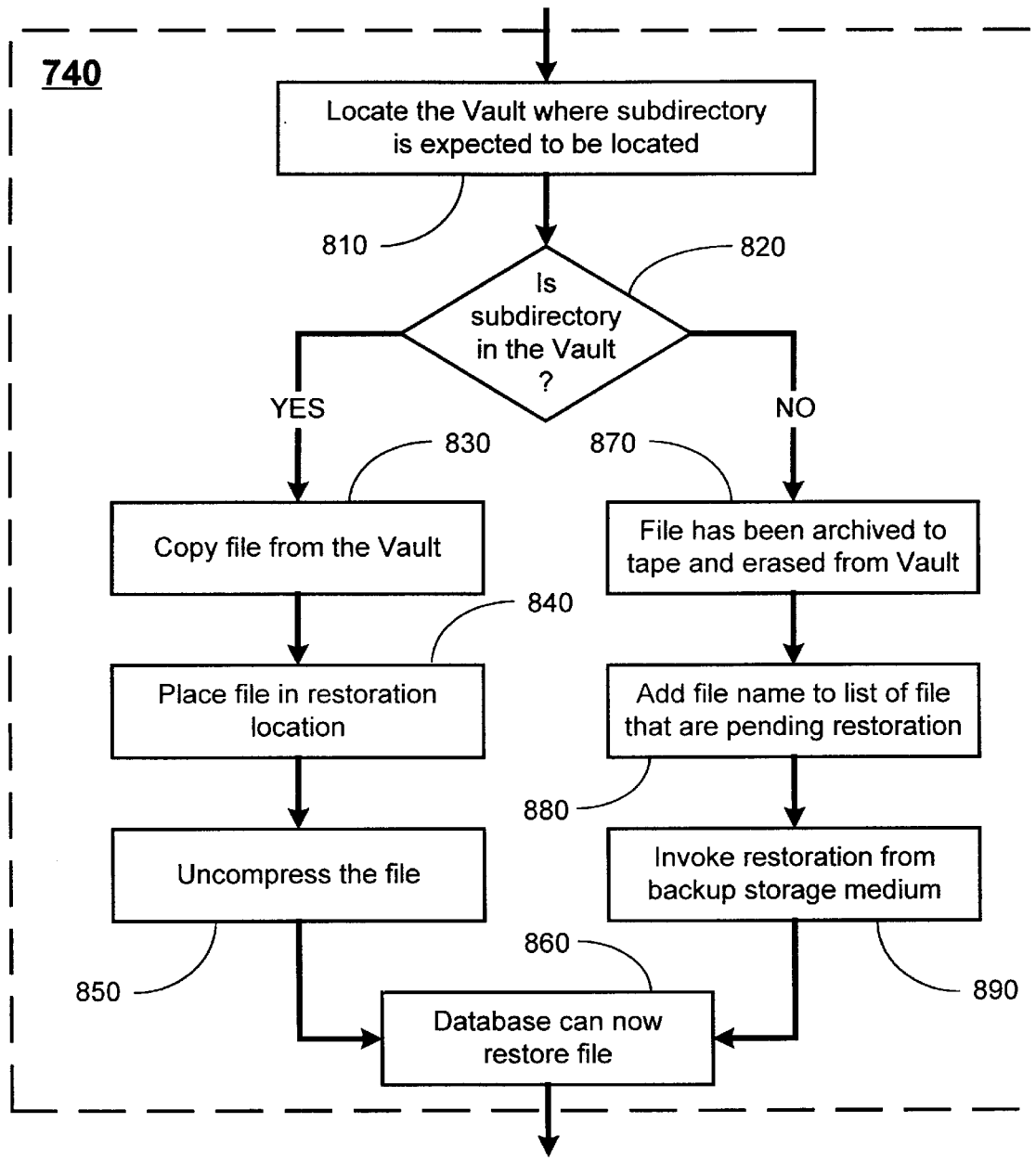
FIG. 8 depicts one embodiment of a more detailed illustration of the step of executing a data restoration process, as described in FIG. 7.

The execution of the restoration process, as described in block 740 of FIG. 7, is described in further detail in FIG. 8. Turning now to FIG. 8, the vault 310 that holds the vault subdirectory 340 that contains the file to be restored is located, as described in block 810 of FIG. 8. In one embodiment, the step described by block 810 is performed by querying the file location database (described in block 450 of FIG. 4). Once the vault 310, which had originally contained the vault subdirectory 340 that holds the file that is to be restored, is found, that particular vault 310 is searched to locate the vault subdirectory 340, as described in block 820.

If the vault subdirectory 340 that contains the file that is to be restored is found in the vault 310, the file is copied from the vault 310 and placed into a restoration location, as described by blocks 830 and 840 of FIG. 8. In one embodiment, the restoration location is a temporary directory that can be accessed by the primary database 110. Once the file that is to be restored is placed into the restoration location, the file is uncompressed, as shown in block 850. When the file is uncompressed, the database can restore the file, as described in block 860 of FIG. 8.

If the vault subdirectory 340 does not contain the file that is to be restored, a conclusion can be made that this particular file, or a particular vault subdirectory 340, has been archived to a backup storage medium and has been deleted from the vault 310, as described in block 870 of FIG. 8. In one embodiment, the backup storage medium is a backup tape. The file name is then added to a list of file names that are pending restoration from backup storage, as described in block 890 of FIG. 8. In one embodiment, the backup storage is generally performed on backup tape. Once the file names are added to the list of files pending restoration from the backup tape, restoration procedures to recover files from backup storage are invoked, as described in block 890 of FIG. 8.

Figure 9:
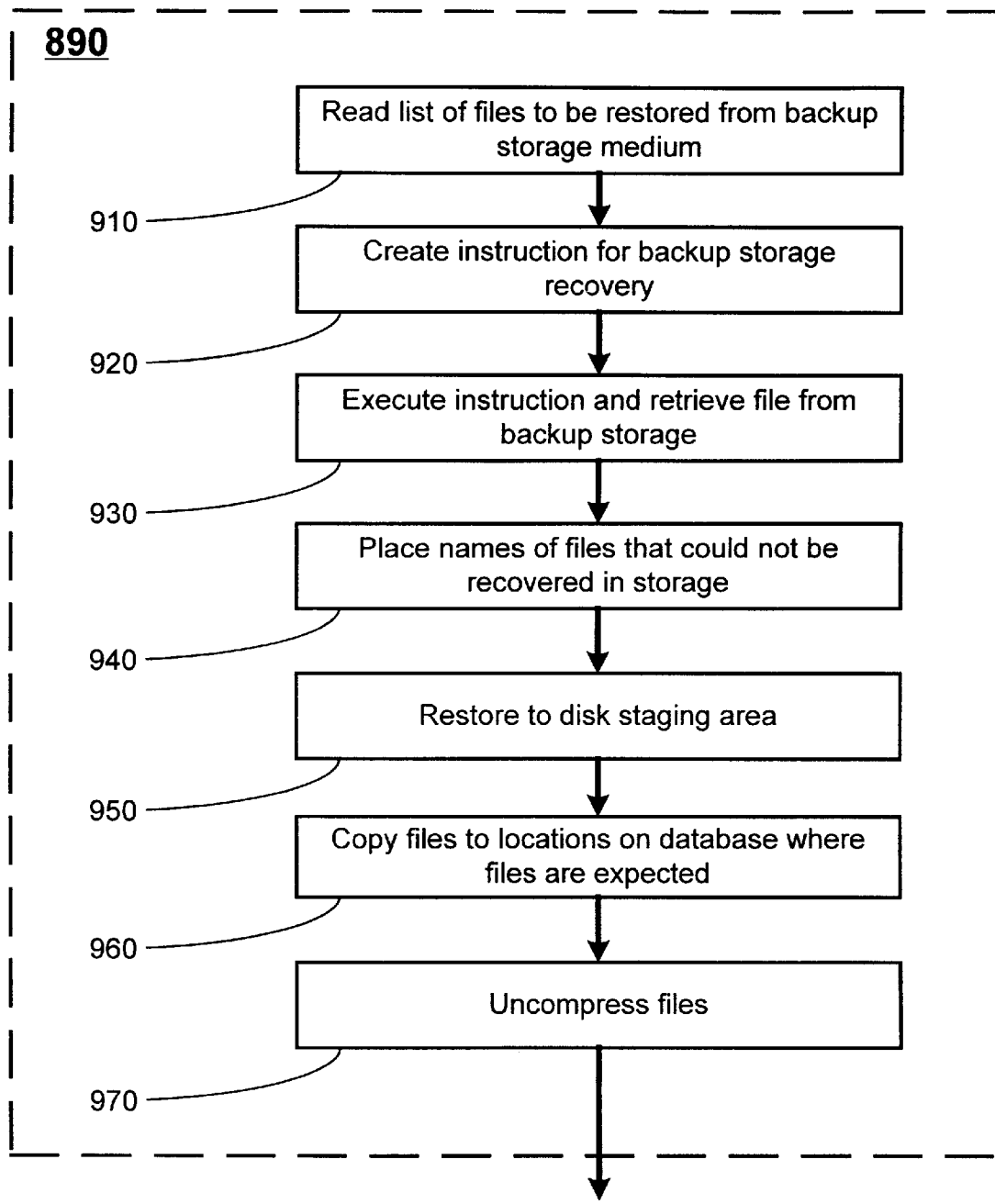
FIG. 9 depicts one embodiment of a more detailed illustration of the step of executing a tape-data restoration process, as described in FIG. 8.

The step of restoring data from backup storage, as described in block 890 of FIG. 8, is illustrated in further detail in FIG. 9. Turning now to FIG. 9, the list of files that are to be recovered from backup storage is read, as described in block 910 of FIG. 9. Once the list of files to be recovered from backup storage is read, and since their locations are already known, a set of instructions for backup storage recovery is generated, as described in block 920 of FIG. 9. In one embodiment, the appropriate backup storage medium (such as a backup tape) is then loaded, the instructions are executed, and, thus, the file is retrieved from the backup storage medium (such as a backup tape), as described in block 930. It is possible that a file may not be recovered after the recovery instructions are performed. There are multiple factors that may prevent the restoration of files. One such factor is that the proper backup storage medium (such as a backup tape) may have been removed from the backup storage jukebox. Other system failures may cause the prevention of file restoration. If a file has not been recovered, the name of the file that could not be recovered is stored, at least in temporary memory, as described in block 940.

Once a file has been recovered from backup storage, it is placed into a staging area on a disk, as described in block 950. The file from the staging area is then copied to a location where the primary database 110 will search for the file, as described in block 960. The file is then uncompressed, which renders the file in a format that can be read by the primary database 110, as described in block 970 of FIG. 9. At this point, the step of restoring data from backup storage, as described in block 890 of FIG. 8, is complete. Turning back to FIG. 8, the primary database 110 can now restore the retrieved file, as described in block 860 of FIG. 8. Once the primary database 110 restores the retrieved file, the step of executing the restoration process, as described by block 740 of FIG. 7, is concluded.

Turning back to FIG. 7, the restoration list is monitored to check if all of the files on the restoration list have been restored, as described in block 750. If all of the files on the restoration list have not been restored, then the unrestored files are placed in a separate unrestored-file list, as described in block 760. Another attempt to restore the files on the unrestored-file is made during the following execution of the restoration process described in block 740 of FIG. 7,. This process is repeated until all files on the restoration list are restored. Once all of the files on the restoration list are recovered, the restoration process is concluded, as described in block 770 of FIG. 7. The restoration process can be restarted when new file names that are to be restored appear on the list of files to be restored.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A method for archiving and retrieving data from a database, comprising:

creating at least one top-level directory to store files;

creating a file-location database to track stored files in said top level directory;

receiving files from a primary database;

archiving the primary database files into said top level directory, in response to receiving files from a primary database;

creating an immediate backup of the archived primary database files; and creating a long-term backup of said archived primary database files.

2. The method as described in claim 1, wherein said step of executing archiving process further comprises:

creating at least one subdirectory within said top level directory;

creating a file-location database to track stored files in said subdirectory;

receiving files from said primary database;

numbering said subdirectories in said top level database;

assigning said files to be stored in a highest numbered subdirectory;

determining whether said highest numbered subdirectory contains a maximum allowable number of files;

creating a new subdirectory for file storage, in response to the determination that said highest numbered subdirectory contains a maximum allowable number of files;

creating a file location database to store name of said file and said subdirectory number; and entering name of said file and said subdirectory number into said file location database.

3. The method as described in claim 2, wherein creating a new subdirectory for file storage, in response to the determination that said highest numbered subdirectory contains a maximum allowable number of files further comprises creating a new subdirectory for file storage, in response to the determination that said highest numbered subdirectory contains one thousand files.

4. The method as described in claim 1, creating an immediate backup of the archived primary database files further comprises:

creating a backup directory in a backup disk;

creating a second copy of each said archived file;

storing said second copy of said archived file into said backup directory;

copying said backup directory into a backup storage medium at a predetermined frequency of time; and deleting said files from said backup directory in response to said backup directory being copied into said backup storage medium.

5. The method as described in claim 4, wherein said step of copying said backup directory into a backup storage medium includes copying said backup directory into a backup tape.

6. The method as described in claim 5, wherein said step of copying said backup directory into a backup storage medium at a predetermined frequency of time further comprises of copying said backup directory into a backup storage medium once every week.

7. The method as described in claim 1, wherein creating a long-term backup of said archived primary database files further comprises:
   determining a period of time that said file has resided in said top level directory;
   determining whether said period of time exceeds a maximum residence time;
   archiving a subdirectory located in said top level directory and which contains said file, into a backup storage medium in response to said period of time exceeding said maximum residence time;
   creating a text file to record identification data relating to said backup storage medium and names of said files in said subdirectory;
   creating a backup database, to record identification data relating to said files and said top level directory, on said storage medium; and
   deleting said files in said subdirectories in said top level directory in response to said subdirectories being archived into said backup storage medium.

8. The method as described in claim 7, wherein said step of determining whether said period of time exceeds a maximum residence time further comprises determining whether said period of time exceeds six months.

9. The method as described in claim 7, wherein said step of archiving a subdirectory located in said top level directory and which contains said file, into a backup storage medium further comprises archiving a subdirectory located in said top level directory and which contains said file, into a backup tape.

10. The method as described in claim 7, wherein said step of creating a backup database, to record identification data relating to said files and said top level directory further comprises creating a backup database, to record names and number of said files and said top level directory.

11. The method as described in claim 1, further comprising a method of retrieving said archived files comprising:
   receiving a list of said archived files to be restored;
   converting said list of archived files to be restored into path file names;
   adding said path file names to a restoration list;
   executing a restoration process at a predetermined time to restore said archived files to be restored;
   determining whether all said archived files to be restored, have been restored;
   placing said path file names corresponding to said archived files that are not restored, on an unrestored-file list, in response to a determination that all said archived files are not restored.

12. The method as described in claim 11, further comprising executing said restoration process to retrieve said archived files on said unrestored-file list.

13. The method as described in claim 11, wherein said step of executing a restoration process at a predetermined time further comprises executing a restoration process at a period of time of reduced data access activity.

14. The method as described in claim 13, wherein said step of executing a restoration process at a period of time of reduced data access activity, further comprises executing a restoration process during night time.

15. The method as described in claim 11, wherein said step of executing a restoration process further comprises:
   locating said top level directory which contains said subdirectory that holds said archived data that is to be restored;
   determining whether said subdirectory that holds said archived file that is to be restored is found in said top level directory;
   copying said archived file from said subdirectory in said top level directory, in response to the determination that said subdirectory that holds said archived file is found in said top level directory;
   placing said copied file in a restoration location;
   uncompressing said copied file in said restoration location to allow said primary database to access said copied file;
   adding the name of said archived file to a restoration-pending file list in response to the determination that said subdirectory that holds said archived file is not found in said top level directory; and
   invoking a restoration procedure to restore said archived file from a backup storage medium to allow said primary database to access said archived file.

16. The method as described in claim 15, wherein said step of placing said copied file in a restoration location further comprises placing said copied file in a temporary directory.

17. The method as described in claim 1, wherein said step of invoking a restoration procedure to restore said archived file from a backup storage medium further comprises invoking a restoration procedure to restore said archived file from a backup tape.

18. The method as described in claim 1, wherein said step of invoking a restoration procedure further comprises:
   reading a list of said archived files to be restored;
   creating an instruction set to recover said archived files to be restored from a storage medium;
   executing said instruction set to retrieve said archived files to be restored from said storage medium;
   placing in memory storage, the name of said archived file that is not recovered;
   restoring said archived file that is recovered from said storage medium, into a staging area;
   copying said archived file from said staging area, into a location on a disk to allow said primary database to access said archived file; and
   uncompressing said archived file to allow said primary database to access said archives file.

19. The method as described in claim 18, wherein said step of restoring said archived file that is recovered from said storage medium further comprises restoring said archived file that is recovered from a backup tape.

20. An apparatus for archiving data, comprising:
   means for creating at least one top level directory to store files;
   means for creating at least one subdirectory within said top level directory;
   means for creating a file-location database to track stored files in said subdirectory and said top level directory;
   means for receiving files from a primary database, to archive said files into said top level directory;

means for archiving the primary database files into said top level directory, in response to receiving files from a primary database;

means for creating an immediate backup of the archived primary database files; and means for creating a long-term backup of said archived primary database files.

21. A system for storing, archiving, and retrieving data, comprising:

a network for transmitting and receiving data;

at least one input system, coupled to said network, for inputting data in at least a first format;

a reformatter, coupled to said network, for receiving said data and reformatting said data into a predetermined format to produce reformatted data;

a primary database, coupled to said network, for storing said reformatted data;

a loader, coupled to said primary database, for loading said reformatted data into said primary database;

at least one client workstation, coupled to said network, for receiving data search requests;

a front end server, coupled to said network, for receiving said primary database search requests and processing said search requests, querying said primary database, receiving reformatted data from said primary database, and outputting said reformatted data;

at least one data archiver, coupled to said primary database, for archiving at least a portion of the data stored in said primary database according to a predetermined archiving algorithm, and for transferring archived data to an archive storage media;

means for creating at least one top-level directory to archive said data stored in said primary database;

means for creating at least one subdirectory within said top level directory;

means for creating a file-location database to track stored files in said subdirectory and said top level directory;

means for receiving said data stored in said primary database, to archive said data said top level directory;

means for archiving the primary database files into said top level directory, in response to receiving files from a primary database;

means for creating an immediate backup of the archived primary database files; and means for creating a long-term backup of said archived primary database files.

22. A computer readable program storage device encoded with instructions that, when executed by a computer, performs a method for archiving data, comprising:

creating at least one top-level directory to store files;

creating a file-location database to track stored files in said top level directory;

receiving files from a primary database;

archiving the primary database files into said top level directory, in response to receiving files from a primary database;

creating an immediate backup of the archived primary database files; and creating a long-term backup of said archived primary database files.

23. The computer readable program storage device encoded with instructions that, when executed by a computer, performs the method described in claim 22, wherein archiving said primary database files further comprises:

creating at least one subdirectory within said top level directory;

creating a file-location database to track stored files in said subdirectory;

receiving files from said primary database;

numbering said subdirectories in said top level database;

assigning said files to be stored in a highest numbered subdirectory;

determining whether said highest numbered subdirectory contains a maximum allowable number of files;

creating a new subdirectory for file storage, in response to the determination that said highest numbered subdirectory contains a maximum allowable number of files;

creating a file location database to store name of said file and said subdirectory number; and entering name of said file and said subdirectory number into said file location database.

24. The computer readable program storage device encoded with instructions that, when executed by a computer, performs the method described in claim 23, wherein creating a new subdirectory for file storage, in response to the determination that said highest numbered subdirectory contains a maximum allowable number of files further comprises creating a new subdirectory for file storage, in response to the determination that said highest numbered subdirectory contains one thousand files.

25. The computer readable program storage device encoded with instructions that, when executed by a computer, performs the method described in claim 22, wherein creating an immediate backup of the archived primary database files further comprises:

creating a backup directory in a backup disk;

creating a second copy of each said archived file;

storing said second copy of said archived file into said backup directory;

copying said backup directory into a backup storage medium at a predetermined frequency of time; and deleting said files from said backup directory in response to said backup directory being copied into said backup storage medium.

26. The computer readable program storage device encoded with instructions that, when executed by a computer, performs the method described in claim 25, wherein copying said backup directory into a backup storage medium comprises copying said backup directory into a backup tape.

27. The computer readable program storage device encoded with instructions that, when executed by a computer, performs the method described in claim 26, wherein copying said backup directory into a backup storage medium at a predetermined frequency of time further comprises of copying said backup directory into a backup storage medium once every week.

28. The computer readable program storage device encoded with instructions that, when executed by a computer, performs the method described in claim 22, wherein creating a long-term backup of said archived primary database files further comprises:

determining a period of time that said file has resided in said top level directory; determining whether said period of time exceeds a maximum residence time;

archiving a subdirectory located in said top level directory and which contains said file, into a backup storage medium in response to said period of time exceeding said maximum residence time;

creating a text file to record identification data relating to said backup storage medium and names of said files in said subdirectory;

creating a backup database, to record identification data relating to said files and said top level directory, on said storage medium; and deleting said files in said subdirectories in said top level directory in response to said subdirectories being archived into said backup storage medium.

29. The computer readable program storage device encoded with instructions that, when executed by a computer, performs the method described in claim 28, wherein determining whether said period of time exceeds a maximum residence time further comprises determining whether said period of time exceeds six months.

30. The computer readable program storage device encoded with instructions that, when executed by a computer, performs the method described claim 28, wherein archiving a subdirectory located in said top level directory and which contains said file, into a backup storage medium further comprises archiving a subdirectory located in said top level directory and which contains said file, into a backup tape.

31. The computer readable program storage device encoded with instructions that, when executed by a computer, performs the method described in claim 28, wherein creating a backup database, to record identification data relating to said files and said top level directory further comprises creating a backup database, to record names and number of said files and said top level directory.

32. The computer readable program storage device encoded with instructions that, when executed by a computer, performs the method described in claim 22, further comprising a method of retrieving said archived files comprising:

receiving a list of said archived files to be restored;

converting said list of archived files to be restored into path file names;

adding said path file names to a restoration list;

executing a restoration process at a predetermined time to restore said archived files to be restored;

determining whether all said archived files to be restored, have been restored;

placing said path file names corresponding to said archived files that are not restored, on an unrestored-file list, in response to a determination that all said archived files are not restored.

33. The computer readable program storage device encoded with instructions that, when executed by a computer, performs the method described in claim 32, further comprising executing said restoration process to retrieve said archived files on said unrestored-file list.

34. The computer readable program storage device encoded with instructions that, when executed by a computer, performs the method described in claim 32, wherein executing a restoration process at a predetermined time further comprises executing a restoration process at a period of time of reduced data access activity.

35. The computer readable program storage device encoded with instructions that, when executed by a computer, performs the method described in claim 34, wherein executing a restoration process at a period of time of reduced data access activity, further comprises executing a restoration process during night time.

36. The computer readable program storage device encoded with instructions that, when executed by a computer, performs the method described in claim 32, wherein executing a restoration process further comprises:

locating said top level directory which contains said subdirectory that holds said archived data that is to be restored;

determining whether said subdirectory that holds said archived file that is to be restored is found in said top level directory;

copying said archived file from said subdirectory in said top level directory, in response to the determination that said subdirectory that holds said archived file is found in said top level directory;

placing said copied file in a restoration location;

uncompressing said copied file in said restoration location to allow said primary database to access said copied file;

adding the name of said archived file to a restoration-pending file list in response to the determination that said subdirectory that holds said archived file is not found in said top level directory; and invoking a restoration procedure to restore said archived file from a backup storage medium to allow said primary database to access said archived file.

37. The computer readable program storage device encoded with instructions that, when executed by a computer, performs the method described in claim 36, wherein placing said copied file in a restoration location further comprises placing said copied file in a temporary directory.

38. The computer readable program storage device encoded with instructions that, when executed by a computer, performs the method described in claim 22, wherein invoking a restoration procedure to restore said archived file from a backup storage medium further comprises invoking a restoration procedure to restore said archived file from a backup tape.

39. The computer readable program storage device encoded with instructions that, when executed by a computer, performs the method described in claim 22, wherein invoking a restoration procedure further comprises:

reading a list of said archived files to be restored;

creating an instruction set to recover said archived files to be restored from a storage medium;

executing said instruction set to retrieve said archived files to be restored from said storage medium;

placing in memory storage, the name of said archived file that is not recovered;

restoring said archived file that is recovered from said storage medium, into a staging area;

copying said archived file from said staging area, into a location on a disk to allow said primary database to access said archived file; and uncompressing said archived file to allow said primary database to access said archived file.

40. The computer readable program storage device encoded with instructions that, when executed by a computer, performs the method described in claim 39, wherein restoring said archived file that is recovered from said storage medium further comprises restoring said archived file that is recovered from a backup tape.

\* \* \* \* \*

UNITED STATES PATENT AND TRADEMARK OFFICE
CERTIFICATE OF CORRECTION

PATENT NO.   : 6,266,679 B1
DATED        : July 24, 2001
INVENTOR(S)  : Bruce Szalwinski and Michael E. Winslett It is certified that error appears in the above-identified patent and that said Letters Patent is hereby corrected as shown below:

<u>Column 13,</u>
Line 18, between "described" and "claim" insert -- in --.

Signed and Sealed this

Eighteenth Day of June, 2002

*Attest:*

*Attesting Officer*

JAMES E. ROGAN
*Director of the United States Patent and Trademark Office*